United States Patent [19]

Kissling et al.

[11] 4,195,457

[45] Apr. 1, 1980

[54] CLOSURE DEVICE FOR PRESSURE VESSELS

[75] Inventors: Günter Kissling, Hemsbach; Erich Filser, Oberkirchen, both of Fed. Rep. of Germany

[73] Assignee: Hochtemperatur-Reaktorbau GmbH, Cologne, Fed. Rep. of Germany

[21] Appl. No.: 885,376

[22] Filed: Mar. 10, 1978

[30] Foreign Application Priority Data

Mar. 12, 1977 [DE] Fed. Rep. of Germany ....... 2710859

[51] Int. Cl.² .......................................... B65D 53/00
[52] U.S. Cl. ............................... 52/224; 52/223 R; 52/245; 52/248; 220/378
[58] Field of Search ............. 52/20, 21, 224, 245–249, 52/223 R; 176/87; 220/378

[56] References Cited

U.S. PATENT DOCUMENTS

| 3,503,171 | 3/1970 | Frohly | 52/248 X |
| 3,669,303 | 6/1972 | Launay | 220/378 |
| 3,979,866 | 9/1976 | Prescott | 52/249 |
| 4,057,162 | 11/1977 | Gross | 52/223 R |
| 4,081,323 | 3/1978 | Gans et al. | 176/87 X |

*Primary Examiner*—J. Karl Bell
*Attorney, Agent, or Firm*—Schwartz, Jeffery, Schwaab, Mack, Blumenthal & Koch

[57] ABSTRACT

Disclosed is a closure combination for pressure vessels comprising a carrier cover in contact with a sealing cover for covering and closing an opening in a pressure vessel by contact with a flange member of a liner element disposed within the opening in the pressure vessel and sealed by a sealing means in communication with the flange member and the sealing cover.

16 Claims, 11 Drawing Figures

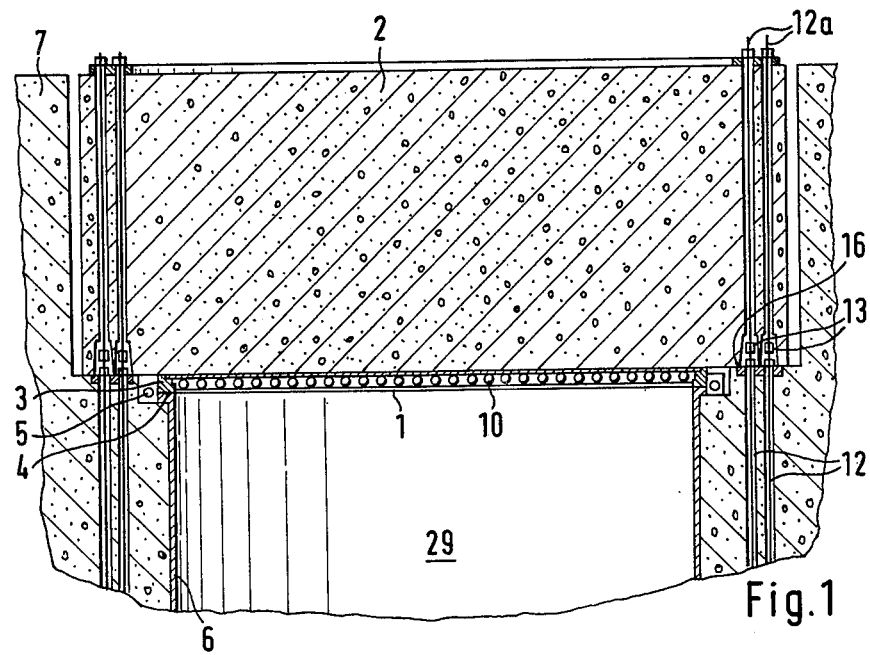
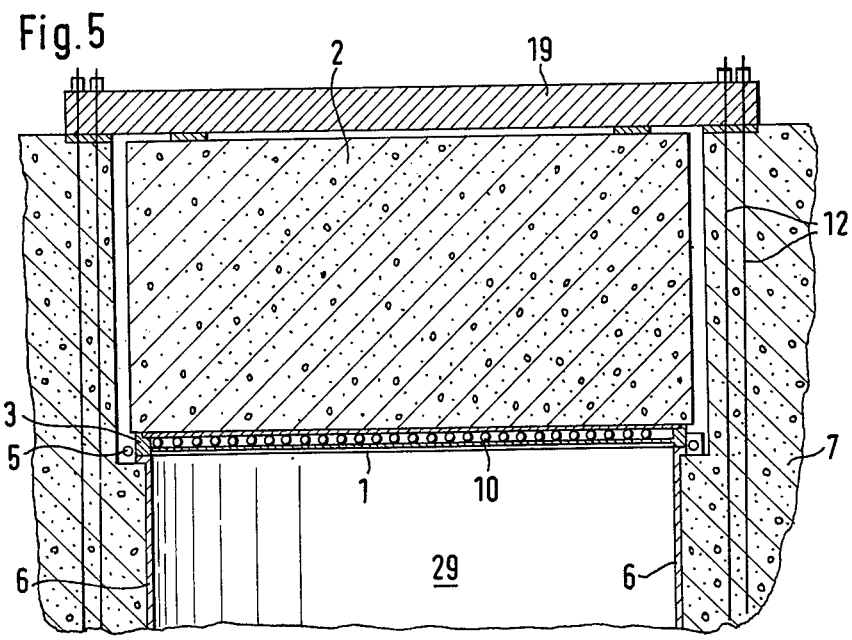

CLOSURE DEVICE FOR PRESSURE VESSELS

BACKGROUND OF THE INVENTION

1. Field Of The Invention

The invention concerns a closure device for large openings in vessels under high pressure, preferably for holes or openings covered with a liner in a prestressed pressure vessel, consisting of several closure parts superimposed upon each other.

2. Background Of The Prior Art

A closure device for an access opening in the wall of a prestressed concrete pressure vessel is described in West German Patent Application No. 17 84 369 showing two parts superimposed upon each other. The first part consists of prestressed concrete and the second part is formed by a metal plate affording a leak-proof sealing of the access opening. The two parts of the closure are not in direct contact with each other, i.e., the prestressed concrete part imposes no pressure on the metal plate to increase the sealing effect.

In West German Patent Application No. 17 84 625, a removable cover for a prestressed pressure vessel is also described, but in this case, several circumferential pressure pieces are arranged around a central closure piece. The circumferential pieces are pressed by circumferential bands radially against the central closure piece, leaving radial interspaces between themselves. The central closure piece consists of several disks superimposed upon each other. They are pressed securely against each other by tendons arranged in the longitudinal direction of the vessel.

Another closure device for an opening of a vessel is represented in West German Patent Application No. 25 01 021. It is designed in the shape of a plug and both between the plug and the opening and between the plug and the objects leading from the vessel opening and transmitted by the plug, welded lip seals are provided.

Also disclosed in the prior art is the closure arrangement comprising a concrete cover with a steel cover beneath it for a pressure vessel consisting of a steel container and a concrete shroud surrounding said steel vessel. Such a closure is described in West German Patent Application No. 22 19 412. The steel cover is usually attached to the concrete cover and both covers can, therefore, be removed together. If there are only a few openings (e.g. for control rod drivers) through the two covers, it is disclosed that the steel and the concrete covers may be separated for installation.

SUMMARY OF THE INVENTION

The present invention is based on this state of the art. One of the objects of this invention is the creation of a closure device consisting of several pieces to produce a device having a better sealing effect than existing devices and also being simpler to manufacture than conventional closure devices.

This object is attained in accordance with the present invention by functionally separating the two pieces of the closure device and designing them as a sealing cover and a carrying cover, holding the two covers in place with tendons acting in the longitudinal direction of the vessel. In this manner, the sealing cover is pressured against the carrying cover under stress provided by the internal pressure of the vessel. The sealing cover possesses a flange portion and is sealed with the aid of a weld lip seal provided at the circumference of the flange, and welded to the liner of the hole or opening.

The flange of the sealing cover also possesses annular grooves on its front side facing the liner for positioning of seal members.

According to the invention, the closure device comprises a load-carrying structure having elements under stress such as prestressed concrete and elements of metallic materials such as cast steel or cast iron or a welded structure, and more elastic elements such as the sealing cover made preferably of steel. The load-carrying cover may consists in a known manner of several pieces, e.g. a center part and an annular part, their adjacent surfaces forming the frustum of a cone. The covers are functionally completely separate, based on the principle that, the concrete or cast part should essentially perform the load-carrying function, while the steel part or liner member should have a sealing function only.

By using the closure device of the invention, the liner for the hole or opening to be sealed can be employed significantly more readily than in the conventional manner, thus substantially reducing production costs. The closure device itself also becomes substantially less expensive compared to conventional devices, due to its simpler form.

The tendons acting in the longitudinal direction of the pressure vessel, may in one advantageous embodiment, pass through the carrier cover itself. The tendons also act to pressure the carrier cover against the sealing cover and the sealing cover with its flange onto the liner of the hole or opening. The sealing action produced in this manner is reinforced by the weld lip seal provided in accordance with the invention between the liner and the flange of the sealing cover and by the sealing members arranged in the flange itself.

In a preferred embodiment, the carrier cover is held in a known manner with the vertical tendons of the prestressed pressure vessel and, at the same time, the tendons may connect with the segments of the tendons arranged within the carrier cover by way of tendon coupling members.

In order to assure the close control function of the closure device, the space between the individual seals in the flange of the sealing cover and between one of these seals and the weld lip seal may conveniently be kept under surveillance by way of a control line with respect to pressure and leakage.

In one particularly advantageous embodiment of the invention, the centering of the sealing cover with the liner of the hole or the opening can be accomplished conveniently with the aid of pins. The pins may be supported in projections welded to the flange of the sealing cover and may also engage additional projections fastened to the end of the liner.

In order to protect the sealing cover against undue heating, it is convenient to equip the cover with a cooling means. One particularly advantageous cooling means is an arrangement of cooling coils.

The sealing cover may be designed with double walls. In a preferred embodiment, stiffening or reinforcement members are provided between the walls. In this arrangement a cooling means may also be located between the two walls such as a circuit of cooling coils. Advantageously, pressure equalizing openings may be located in the lower wall of the sealing cover so that the sealing cover is under pressure equalized with its stiffened or reinforced part.

Connecting structures for vessel installations may also be placed on reinforced sealing covers, e.g. for installations in nuclear reactors when the pressure vessel serves to house such a reactor. The sealing cover then performs the function of a load carrying structure for the reactor installation in addition to its sealing function.

If the closure device according to the invention has a lead-through opening, e.g. to install blowers or turbines for the primary circuit of a nuclear reactor located within the pressure vessel, a pressure-carrying vessel penetration may be installed in said lead-through opening, which in a further preferred embodiment of the invention, can be fastened by way of a bolted connection over the sealing cover frictionally to the carrier cover.

Advantageously, the closure device of the invention may possess a retaining cover in addition to the sealing and carrying covers. The retaining cover may be arranged above the carrier cover making possible the elimination of the borings for the tendons otherwise present in the carrier cover.

In this embodiment, the retaining cover is held by tendons of the prestressed pressure vessel. These tendons may also be subdivided, in which case the individual segments are connected with each other by way of coupling members.

It is advantageous to fill the gap between the carrier cover and the prestressed pressure vessel with a contact material to obtain the best possible transfer of compressive forces from the carrier cover to the prestressed concrete vessel.

According to a further development of the invention, means are provided in the carrier cover permitting the limitation and definition of local compressive forces between the carrier cover and the sealing cover, and providing for an improved load distribution. Such means may consist of supporting elements arranged under spring pressure, for example, a supporting annulus located in the carrier cover or a plurality of supporting plates also installed in the carrier cover. In the embodiment employing supporting plates, such plates may be arranged radially in a partial circle around the axis of the carrier cover. Due to the action of the load distribution means, only a limited compressive force out of the total prestressing force of the tendons acting upon the carrier cover is produced within the area of the flange of the sealing cover.

In place of the supporting elements under spring pressure, pneumatically or hydraulically operated supporting elements may also be used for the purpose in an alternate embodiment.

In a particularly advantageous embodiment, a compensating seal is provided between the flange of the sealing cover and the liner of the penetration or lead-through opening, through which horizontal and vertical relative motions of the sealing cover and the liner may be equalized. In this manner, overstressing in critical areas may be avoided. Such overstressing may be generated by a number of causes, such as, e.g. the horizontal and vertical prestressing of the pressure vessel, the creep of the concrete in prestressed concrete pressure vessels due to the prestress, the fastening of the carrier cover and the internal pressure of the vessel.

The compensating seal can be designed in different ways. Thus, the seam between the flange of the sealing cover and the liner can be kept at a minimum and bridged over with an annular elastic sealing element that is welded both to the flange and the liner. A narrow seal between said parts can be achieved, e.g. with expansion sheets or a contact mass between the carrier and the sealing covers or through the mechanical working of the contact surfaces between said covers.

In another embodiment of the compensating seal, the seam between the flange and the liner is divided into several seams and a number of elastic sealing elements are provided which bridge over the seam bilaterally. In this case, therefore, the stress on the compensating seal is distributed over several sealing elements, which substantially reduces it for the individual elements.

Suitably, the compensating seal may be designed so that it can be screwed off. This offers considerable advantages compared to welded designs with respect to installation techniques, particularly in case of repairs. The compensating seal advantageously includes an elastic sealing element with two flanges and being welded to both. One of the flanges may also be connected with the flange of the sealing cover and the other with the liner, through bolted connections.

In all of the embodiments of the compensating seal named in the foregoing, the elastic sealing elements themselves can be designed with double walls and the space between the walls is filled with a sealing gas, e.g. helium, in a particularly advantageous manner.

DETAILED DESCRIPTION OF THE INVENTION

Figure 2:
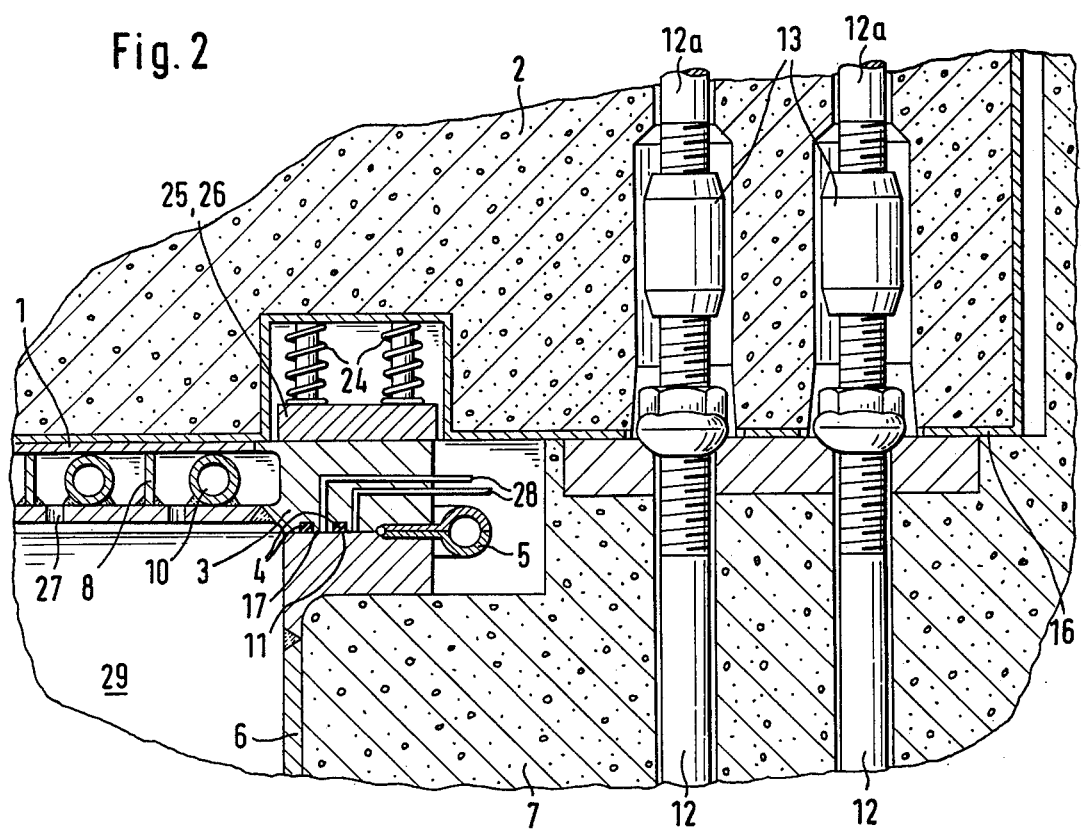
Figure 3:
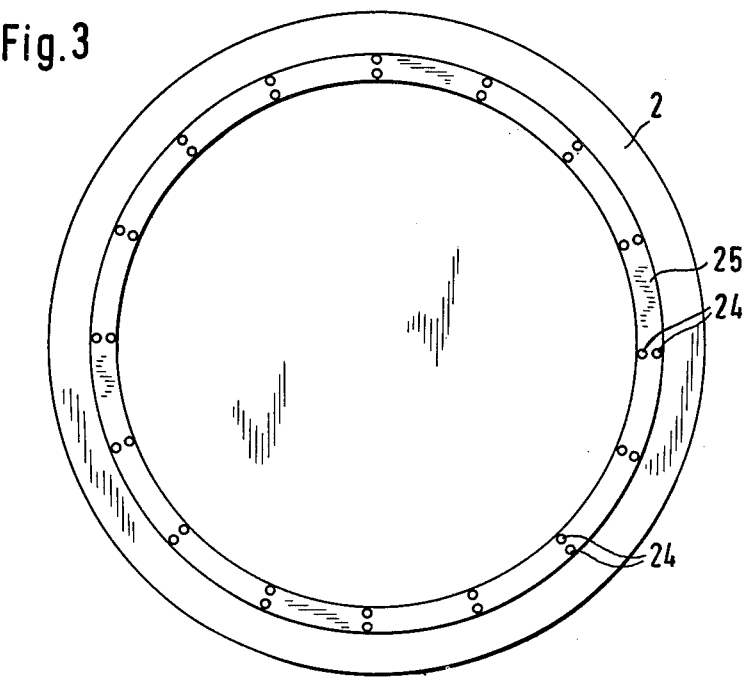

The drawings represent several examples and embodiments of the closure device according to the invention. The individual figures show the following:

FIG. 1—a closure device consisting of a sealing cover and a carrier cover in a vertical cross section;

FIG. 2—an enlarged section taken from FIG. 1 showing spring loaded supporting elements;

FIG. 3—a horizontal cross-section through FIG. 1 in the area of the supporting elements showing an annular supporting element.

Figure 4:
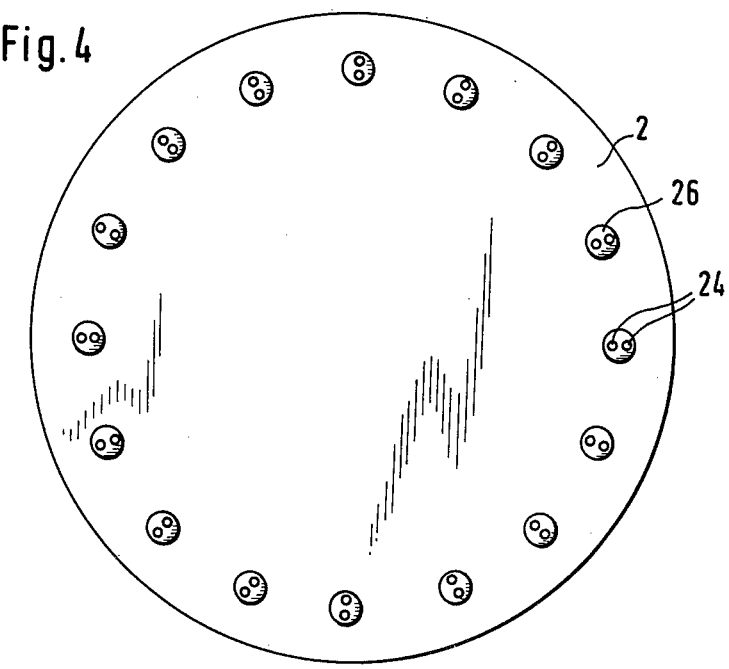
Figure 6:
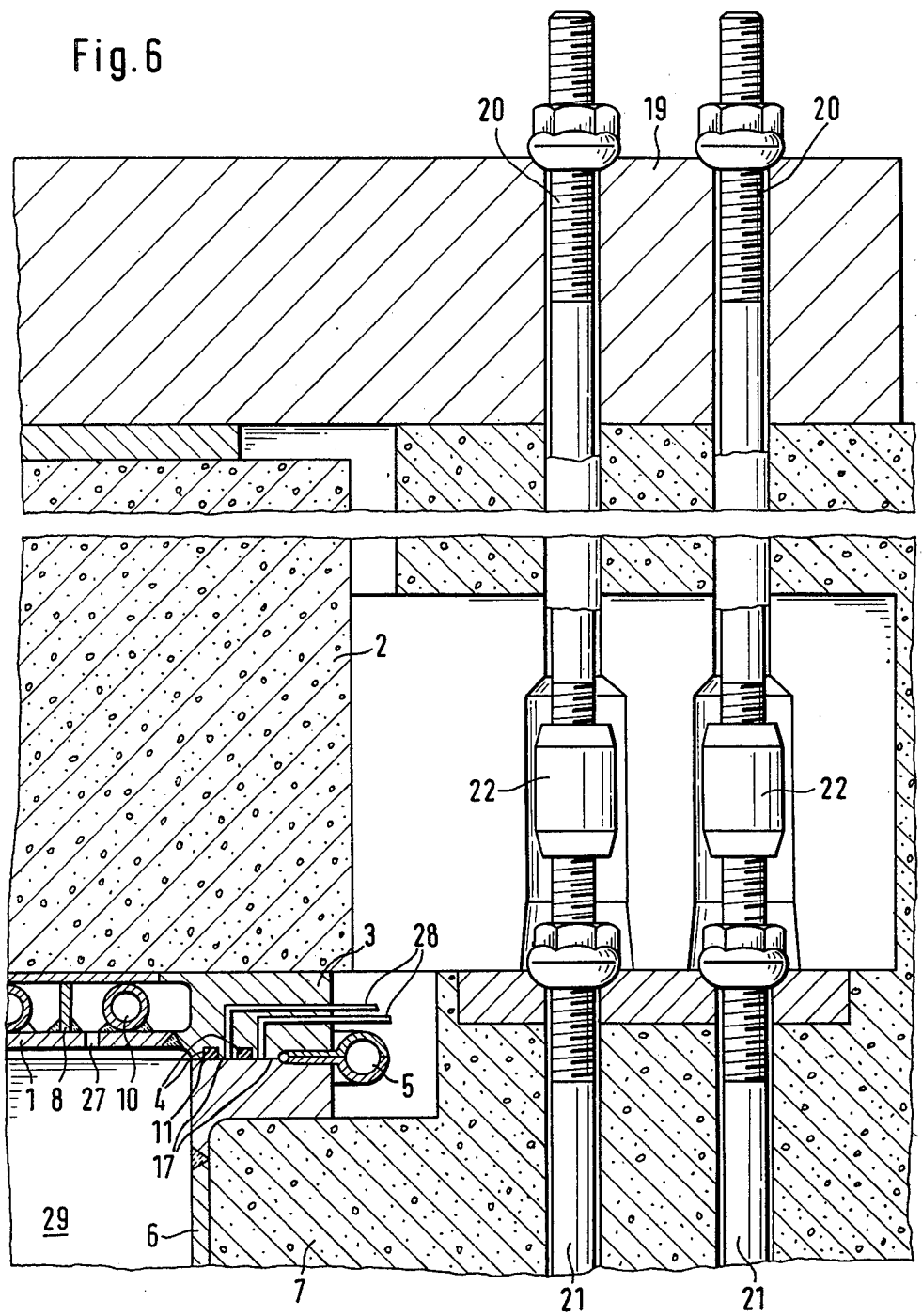
Figure 7:
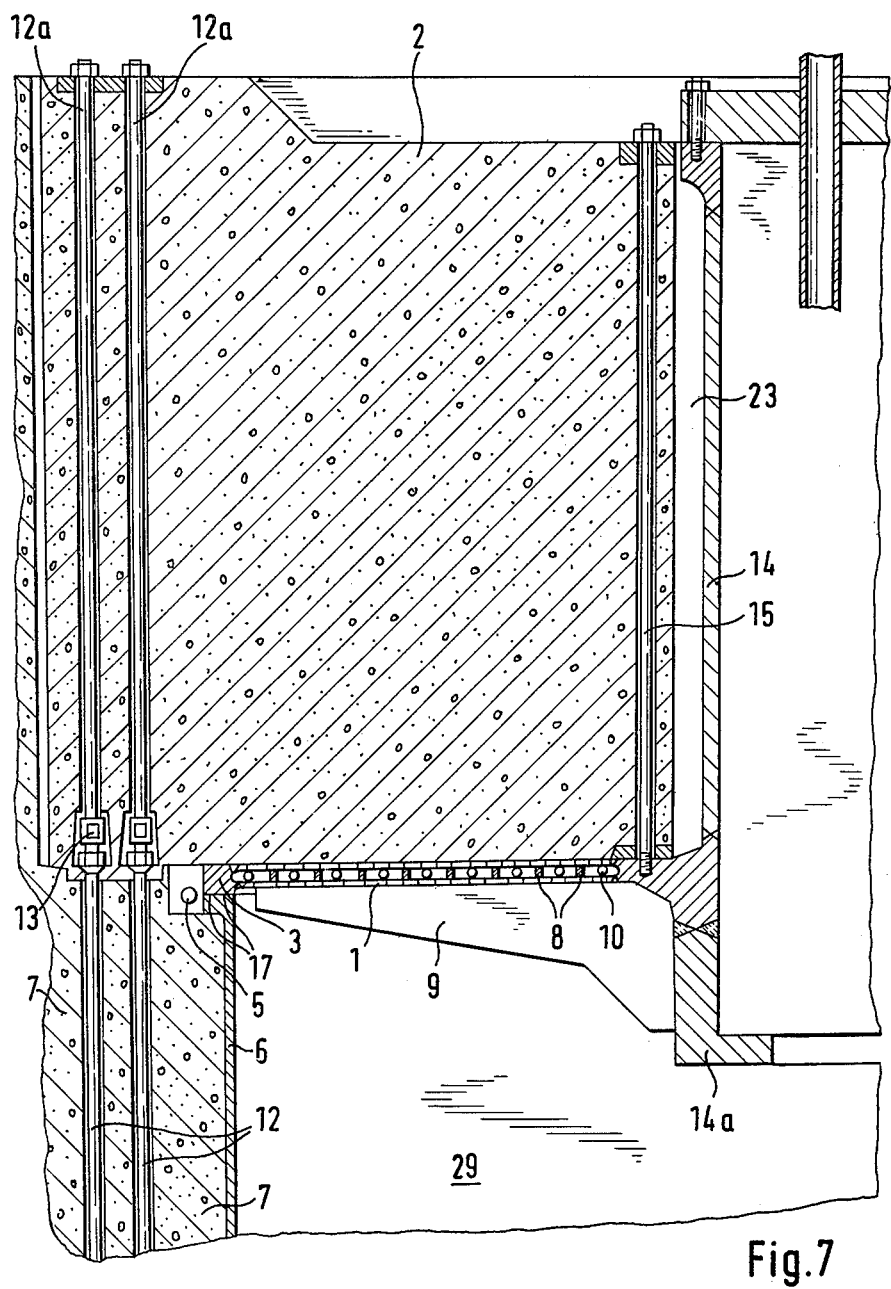
Figure 8:
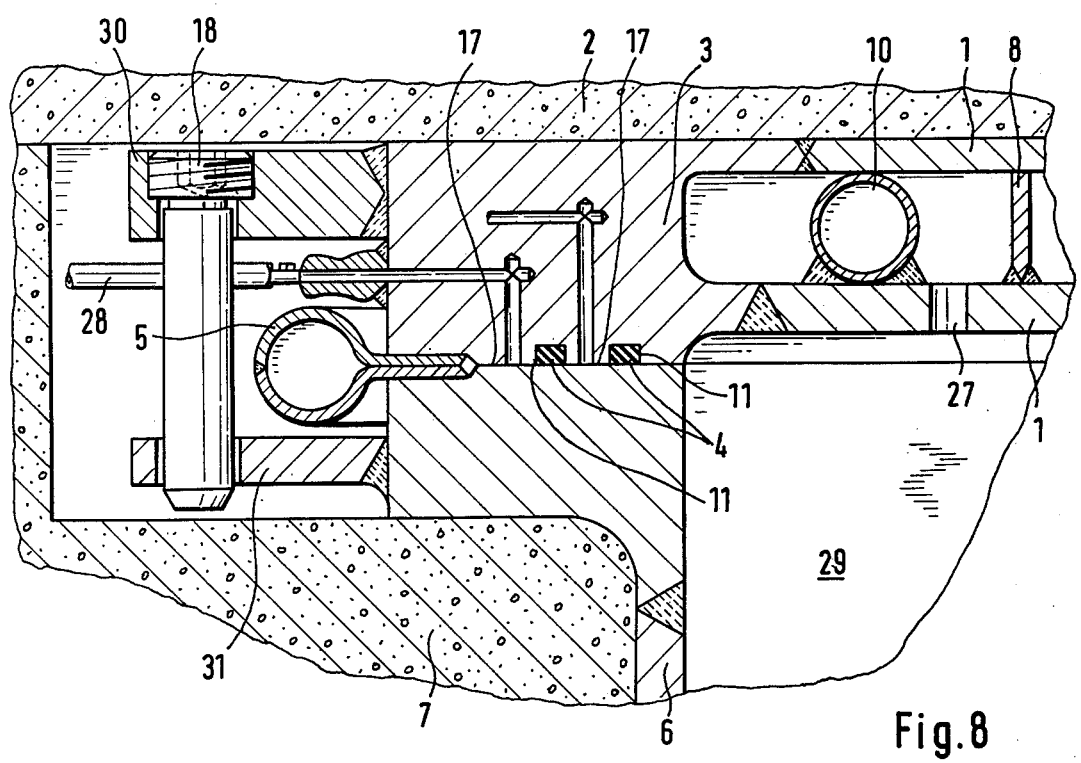
Figure 9:
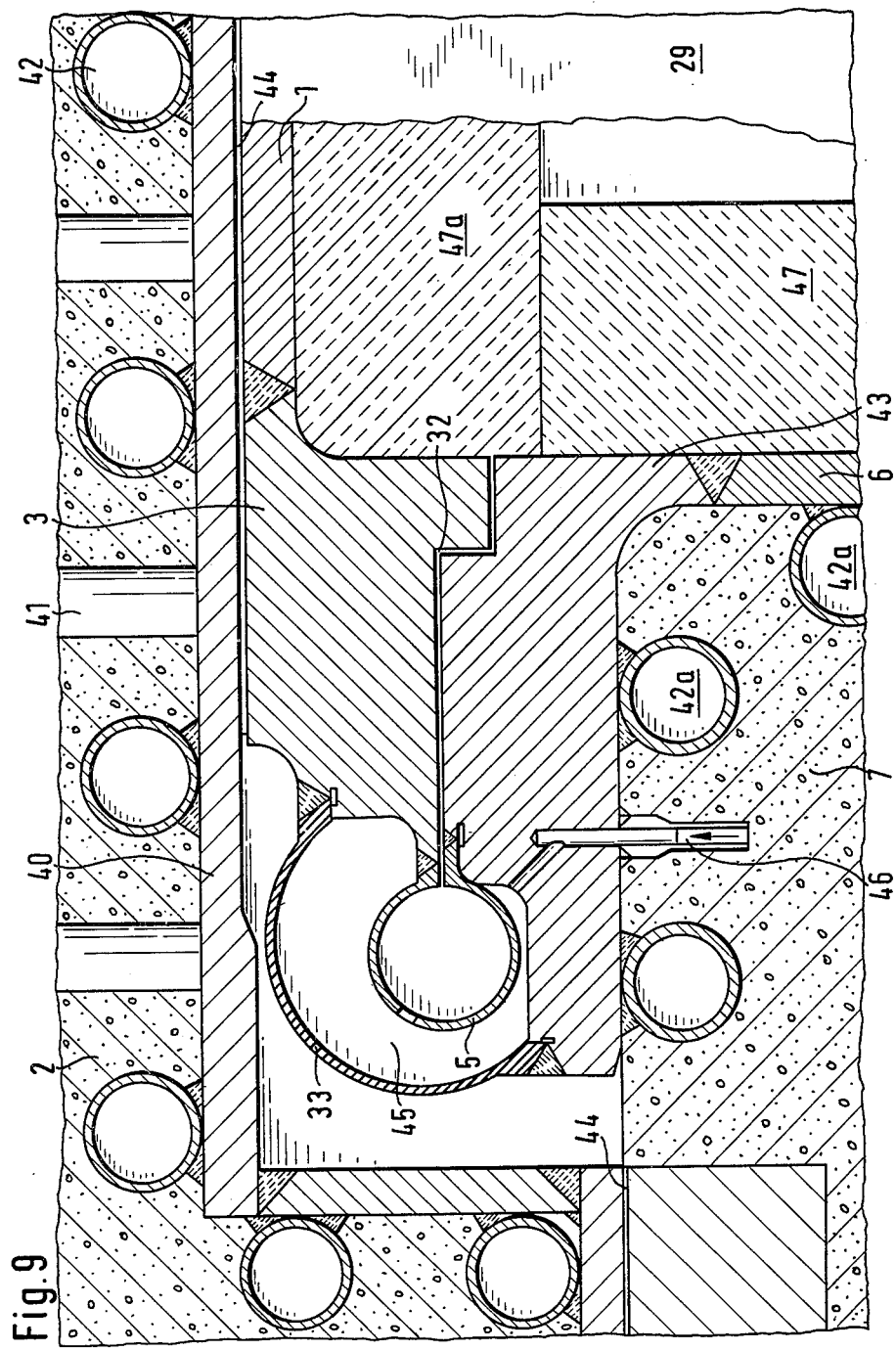
Figure 10:
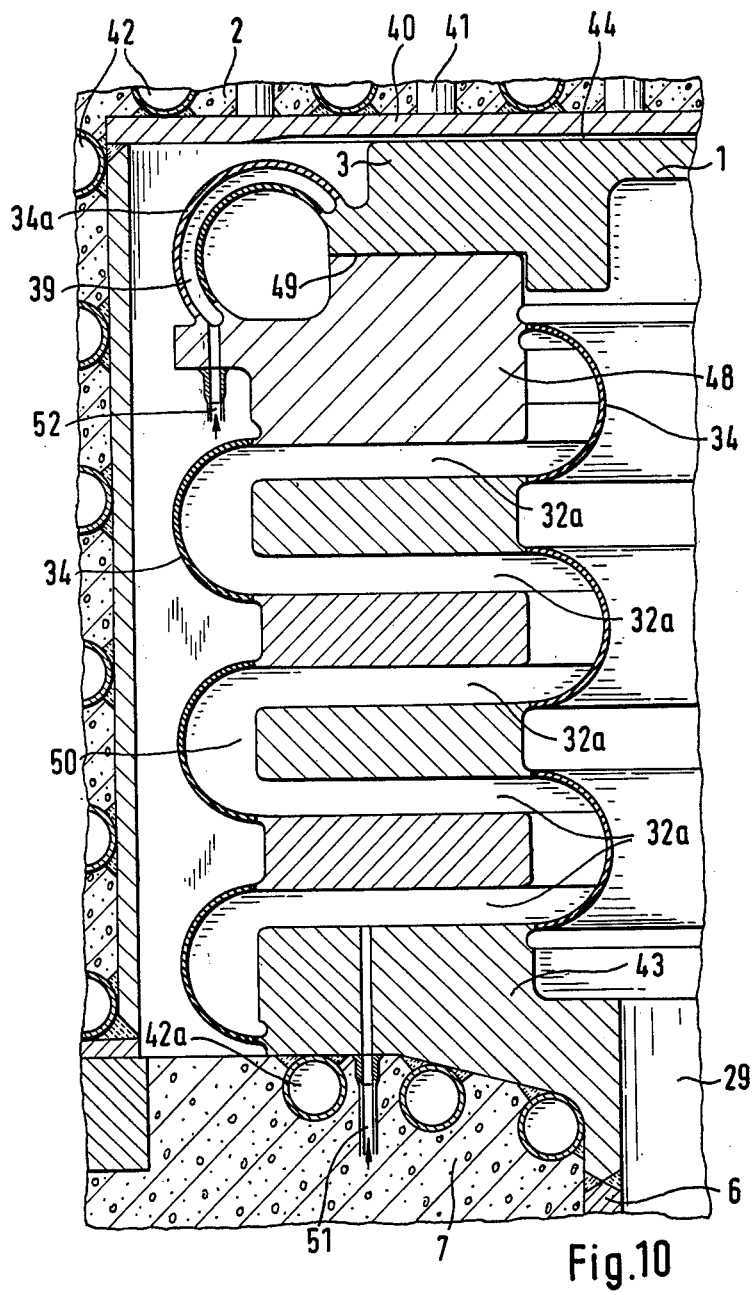
Figure 11:
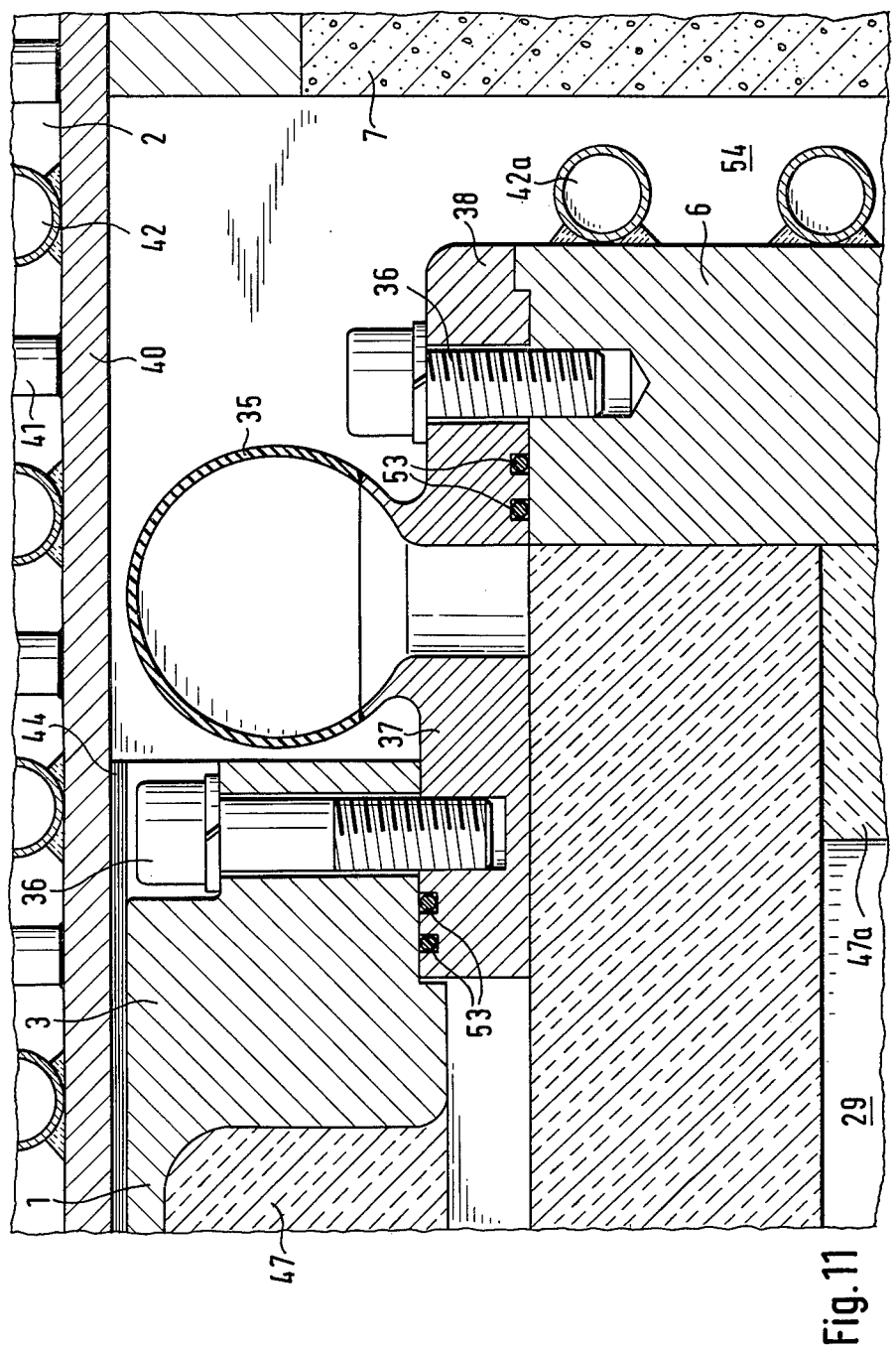

FIG. 4—a horizontal cross section through FIG. 1 in the area of the supporting elements showing a plurality of plate-like supporting elements;

FIG. 5—a closure device consisting of sealing cover, carrier cover and retaining cover in a vertical cross section showing unitary tendons;

FIG. 6—a closure device consisting of sealing cover, carrier cover and retaining cover showing composite tendons;

FIG. 7—a segment of a closure device without a retaining cover showing a pressure-carrying penetration;

FIG. 8—a segment of a closure device according to the invention of arbitrary design showing a centering device;

FIG. 9—a segment of a closure device showing a compensating seal;

FIG. 10—a segment of a closure device showing a compensating seal of a different design, and FIG. 11—a segment of a closure device showing a screw off compensating seal.

DESCRIPTION OF THE PREFERRED EMBODIMENTS

FIG. 1 shows a closure device for a lead-through member of vessel penetration member 29 located in a prestressed concrete vessel 7. The closure comprises a sealing cover 1 and a carrier cover 2. Vessel penetration 29 is lined with a metallic liner 6 which is expanded at its upper end in the shape of a flange. Within the prestressed concrete pressure vessel 7, a nuclear reactor (not shown) for example may be installed. Vertical tendons 12 are passed through the prestressed concrete pressure vessel. They are connected with additional tendon segments 12a through coupling members 13. The additional tendon segments are arranged, as are the coupling members 13, in the carrier cover 2 which is made of concrete. The gap 16 between the carrier cover 2 and the prestressed concrete pressure vessel 7 is filled with a contact mass (not shown).

As shown in FIG. 2, the metal sealing cover 1 has a flange 3 on its circumference, which rests upon the flange-like expansion of liner 6 and possesses several annular grooves 11 on its front side facing said liner. Seals 4 are placed in the grooves 11. Another seal between liner 6 and flange 3 is designed in the form of a weld lip seal 5. A control line 28 is provided for the surveillance of the space 17 between the seals 4 and between one of the seals 4 and the weld lip seal 5 with respect to pressure and leakage.

FIG. 2 further shows that the sealing cover 1 is of a double wall design. Stiffening or reinforcement elements 8 are welded in between the walls of the sealing cover 1. The chambers formed by the stiffening elements 8 between the walls of the sealing cover are equipped with pressure equalizing openings 27. A cooling system consisting of the cooling tubes 10 for the sealing cover 1 is additionally installed in the chambers.

To limit the compressive force between the carrier cover 2 and the sealing cover 1, the carrier cover 2 has a recess in which a supporting element exposed to the pressure of the springs 24, is arranged. The supporting element can be designed as an annular supporting element 25, as shown in FIG. 3, or it may include a plurality of supporting plates 26 arranged in a circle around the axis of the carrier cover 2. This mode of embodiment is shown in FIG. 4.

In FIG. 5, a closure device consisting of three parts is represented. The device again includes a sealing cover 1, a carrier cover 2 and additionally, a retaining cover 19. Identical details here and in the figures following hereafter are designated by the same reference numbers. The retaining cover 19 in this example of the embodiment is held by the vertical tendons 12 of the prestressed concrete pressure vessel 7. The carrier cover 2 displays no lead-through borings.

In the case of the closure device shown in FIG. 6, which also consists of a sealing cover 1, carrier cover 2 and retaining cover 19, the vertical tendons holding the retaining cover 19 are divided into tendon segments 20 and 21, connected with each other through coupling members 22. The coupling members 22 are located in a recess within the prestressed concrete pressure vessel 7.

The closure device 7 represented in FIG. 7 has a lead-through member 23 in which a pressure-carrying vessel penetration 14 is installed. The latter is connected frictionally over the sealing cover 1, with the aid of a bolted connection 15 with the carrier cover 2. The sealing cover 1 further exhibits a connecting structure 9 designed as a carrying structure for reactor installations, e.g. for a structural part 14a attached to the vessel penetration 14.

The closure device shown in FIG. 8 is a device designed arbitrarily within the scope of the invention. Alternately, it may consist of two or three closure parts and may possess segmented or unitary tendons. The figure shows that the sealing cover 1 is centered on the liner 6 of the vessel penetration 29 by a number of bolts 18. These are set into a projection 30 welded to the flange 3 and they engage borings located in projection 31 on liner 6.

FIG. 9 again displays a sealing cover 1 equipped with a flange 3. A carrier cover 2 is arranged over it. The latter exhibits a carrier cover bottom plate 40, to which anchor bolts 41 are fastened. In this closure device, the carrier cover 2 is also equipped with a cooling system 42 and liner 6 also has a cooling system 42a. In order to minimize the size of the seam 32 between the flange 3 and the flange-like extension 43 of the liner 6, lining plates 44 are arranged between the bottom plate of the carrier cover 40 and the sealing cover 1. A compensating seal 33 designed in the form of an annular elastic sealing element bridges the seam 32. It is welded on one side to flange 3 and on the other side to the flange-like expansion of liner 6. The space 45 between the elastic sealing element 33 and the weld lip seal 5 is filled with a sealing gas, e.g. helium, and the sealing gas is supplied to space 45 through line 46. Liner 6 is provided with thermal insulation on its side facing away from the concrete. The sealing cover 1 also has thermal insulation 47a.

In the segment of a closure device according to the invention shown in FIG. 10, compensating flange 48 is arranged between flange 3 of sealing cover 1 and the flange-like expansion 43 of liner 6. It is separated from flange 3 by a narrow seam 49. Compensating flange 48 displays a plurality of seams 32a, which are bridged over on both of their sides by elastic sealing elements 34. In the process, sealing elements 34 facing each other are displaced with respect to each other so that continuous space 50 is created, and is filled with a sealing gas. The latter is supplied to the space through line 51. In the embodiment disclosed, five gaps 32a are provided, but few or greater numbers of gaps are possible. Between flange 3 and compensating flange 48, an elastic sealing element 34a, designed with double walls, is arranged, which is welded to both of the flanges. The space 39 between the two walls of the elastic sealing element 34a is also filled with a sealing gas supplied through the line 52. The elastic sealing elements 34 may be formed of several layers.

In FIG. 11, a compensation seal is shown between the sealing cover flange and the liner and is designed to be replaceable. It includes an elastic sealing element 35 welded to two flanges 37 and 38. Flange 37 is attached to the sealing cover flange 3 by means of bolts 36, while the flange 38 is fastened with similar bolts 36 to the liner 6. Seals 53 are inserted in annular grooves in the flanges 37, 38. The liner 6 is here again equipped with a cooling system 42 on the side facing the concrete. Between the liner 6 and the surrounding concrete of the prestressed concrete pressure vessel 7, a gap 54 extends over a certain "attenuating length" downwards from the end of the liner. This gap keeps the end of the liner free from the stresses generated by the creep of the surrounding concrete.

What is claimed is:

1. A closure combination for pressure vessels, comprising:
  a carrier cover in contact with
  a sealing cover for covering and closing an opening in a pressure vessel by contact with a flange member of
  a liner element disposed within the opening in the pressure vessel and sealed by
  a sealing means in communication with the flange member and the sealing cover, the sealing means comprising a weld lip seal disposed at the circumference of the flange member and welded to the flange member and the sealing cover, tendons extending through the depth of the carrier cover into walls of the pressure vessel and holding the carrier cover in contact with the pressure vessel, and a seal disposed in an annular groove provided in the sealing cover.

2. The closure combination of claim 1, further comprising a retaining cover completely covering the carrier cover, the tendons further extending through the depth of the retaining cover, and the carrier cover positioned between the retaining cover and the sealing cover.

3. The closure combination of claim 2, wherein the tendons comprise tendon segments joined by coupling members.

4. The closure combination of claim 2, wherein the sealing cover contains a cooling circuit disposed between two outside sealing cover wall members.

5. The closure combination of claim 4, wherein one of the sealing cover wall members contains pressure equalizing openings.

6. The closure combination of claim 2, wherein the sealing cover has connecting structures for communication with vessel installations.

7. The closure combination of claim 2, wherein the sealing cover is centered on the liner flange member by means of centering bolts or pins communicating with receiving holes in the sealing cover, liner flange member or both.

8. The closure combination of claim 1, further comprising means for surveillance of pressure and leakage from the sealing means, the surveillance means comprising a control line disposed in the area of contact between the sealing cover and liner flange member.

9. The closure combination of claim 1, further comprising means for equalizing and limiting the pressure of the carrier cover against the sealing cover.

10. The closure combination of claim 9, wherein the pressure equalizing and limiting means comprises a supporting ring disposed in the carrier cover and biased against the sealing cover.

11. The closure combination of claim 9, wherein the pressure equalizing and limiting means comprises a plurality of supporting plates disposed radially about the axis of the carrier cover and biased against the sealing cover.

12. The closure combination of claim 1, wherein the sealing means comprises a compensating seal disposed between and welded to the liner flange member and the sealing cover.

13. The closure combination of claim 1, wherein the sealing means comprises a compensating seal disposed between and bolted to the liner flange member and the sealing cover.

14. The closure combination of claims 12 or 13, wherein the compensating seal is an annular elastic sealing element comprising a plurality of elastic seam sealing covers.

15. The closure combination of claim 14, wherein any of the elastic seam sealing covers are double layered covers defining an area for sealing gas between the layers.

16. The closure combination of claim 14, further comprising a sealing gas supply conduit to the area between the layers.

* * * * *